United States Patent
Maucotel

(10) Patent No.: US 11,862,112 B2
(45) Date of Patent: Jan. 2, 2024

(54) SYSTEM AND METHOD FOR MEASURING AMBIENT LIGHT

(71) Applicant: STMicroelectronics (Grenoble 2) SAS, Grenoble (FR)

(72) Inventor: David Maucotel, Saint Cassien (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 490 days.

(21) Appl. No.: 16/850,327

(22) Filed: Apr. 16, 2020

(65) Prior Publication Data

US 2020/0348170 A1     Nov. 5, 2020

(30) Foreign Application Priority Data

Apr. 30, 2019   (FR) ...................... 1904558

(51) Int. Cl.
| | |
|---|---|
| G01J 1/42 | (2006.01) |
| G01J 1/02 | (2006.01) |
| G09G 5/10 | (2006.01) |
| G09G 3/34 | (2006.01) |

(52) U.S. Cl.
CPC ............ *G09G 3/3406* (2013.01); *G09G 5/10* (2013.01); *G01J 2001/4238* (2013.01); *G09G 2320/0626* (2013.01); *G09G 2360/144* (2013.01)

(58) Field of Classification Search
CPC .................. G09G 3/3406; G09G 5/10; G09G 2320/0626; G09G 2360/144; G01J 2001/4238
See application file for complete search history.

(56) References Cited

U.S. PATENT DOCUMENTS

| | | | |
|---|---|---|---|
| 9,927,291 B2 | 3/2018 | Mellot | |
| 2005/0156496 A1 | 7/2005 | Takashima et al. | |
| 2009/0152445 A1* | 6/2009 | Gardner, Jr. | ......... G09G 3/3406 |
| | | | 250/214 AL |
| 2010/0277786 A1 | 11/2010 | Anderson et al. | |
| 2012/0026139 A1 | 2/2012 | Chou | |
| 2018/0017834 A1 | 1/2018 | Neuman et al. | |
| 2018/0063435 A1 | 3/2018 | Cho et al. | |
| 2018/0211607 A1 | 7/2018 | Kabacinski et al. | |

(Continued)

OTHER PUBLICATIONS

Afonin, Oleg, "iPhone X Eye Strain: How to Stop OLED Flickering in Just Three Clicks", Breaking into iOS 11, https://blog.elcomsoft.com/2018/03/iphone-x-eye-strain-how-to-stop-oled-flickering-in-just-three-clicks/, Mar. 5, 2018, 17 pages.

(Continued)

*Primary Examiner* — Amare Mengistu
*Assistant Examiner* — Jennifer L Zubajlo
(74) *Attorney, Agent, or Firm* — Slater Matsil, LLP

(57) ABSTRACT

An electronic system includes a control circuit to provide a binary control signal alternating between a first binary state during first phases and a second binary state during second phases; a screen controlled by the control signal, the screen emitting light during each first phase, and to not emit any light during each second phase; a light sensor under the screen or along the edge of the screen, and providing a measurement signal representative of a quantity of light received by the sensor during a measurement phase or a plurality of consecutive measurement phases; and a synchronization device to synchronize each measurement phase with a second phase.

20 Claims, 6 Drawing Sheets

(56) References Cited

U.S. PATENT DOCUMENTS

| | | | |
|---|---|---|---|
| 2018/0263091 A1* | 9/2018 | Daman | .................... G09G 1/00 |
| 2018/0348049 A1 | 12/2018 | Yoon et al. | |
| 2020/0348170 A1 | 11/2020 | Maucotel | |
| 2021/0233493 A1 | 7/2021 | Raynor | |
| 2021/0241721 A1 | 8/2021 | Matsumoto et al. | |

OTHER PUBLICATIONS

Barber, Kevin, "Change in Coming to Smartphone Displays", BLOG, https://www.synaptics.com/company/blog/OLED-LCD.

Bugetlightforum, "PWM and Smartphones, AMOLED flaw?", http://budgetlightforum.com/node/52628, Feb. 9, 2017, 7 pages.

Delisle, Jean-Jacques, "New OLED display drivers advance smartphone designs, The advancement is set to usher in a new age of smartphone OLED displays", https://www.electronicproducts.com/Optoelectronics/Displays/New_OLED_display_drivers_advance_smartphone_designs.aspx, May 15, 2018, 3 pages.

"Implementing a very high frame rate (~1Khz) OLED display", Electrical Engineering Stack Exchange, https://electronics.stackexchange.com/questions/64073/implementing-a-very-high-frame-rate-1khz-oled-display, Apr. 2013, 6 pages.

Happich, Julien, "40nm OLED display driver integrated circuit targets smartphone displays without bezels", http://www.eenewsled.com/news/40nm-oled-display-driver-integrated-circuit-targets-smartphone-displays-without-bezels, May 2, 2018, 1 page.

Hurd, David "Synaptics Now Sampling Two New ClearView OLED display Driver ICs", Synaptics, https://www.synaptics.com/company/news/R66455-R66451, Dec. 12, 2017, 3 pages.

Mertens, Ron, "Pulse-width modulation (PWM) in OLED displays", https://www.oled-info.com/pulse width-modulation-pwm-oled-displays, Jan. 14, 2018, 6 pages.

"PWM Ranking—The Best Displays for the Eyes", https://www.notebookcheck.net/PWM-Ranking-Notebooks-Smartphones-and-Tablets-with-PWM.163979.0.html, Apr. 19, 2016, 43 pages.

Solviev, Anton et al., "Overview of teh smartphone Apple iPhone X: the latest flagship with an almost frameless OLED", https://www.ixbt.com/mobile/ap, Nov. 1, 2017, 52 pages.

Wei, Mao-Kuo et al., "Emission Characteristics of Organic Light-Emitting Diodes and Organic Thin-Films with Planar and Corrugated Structures", International Journal of Molecular Sciences, 11(4), pp. 1527-1545, https://www.ncbi.nlm.nih.gov/pmc/articles/PMC2871129/, Apr. 12, 2010.

Wootever, "[KERNEL][G955} AMOLED PWM Flickerfree", XDA, https://forum.xda-developers.com/galaxy-s8+/development/amoled-pwm-s8-t3716663, Dec. 8, 2017, 11 pages.

AUTOSAR, "E2E Protocol Specification", AUTOSAR FO R19-11, Mar. 29, 2019, 185 pages.

* cited by examiner

SYSTEM AND METHOD FOR MEASURING AMBIENT LIGHT

CROSS-REFERENCE TO RELATED APPLICATIONS

This application claims priority to French Patent Application No. 1904558, filed on Apr. 30, 2019 which application is hereby incorporated herein by reference.

TECHNICAL FIELD

The present disclosure generally relates to electronic systems, and more specifically to electronic systems in which the light intensity emitted by a screen of the system and perceived by a user is adjusted as a function of the surrounding ambient light.

BACKGROUND

Electronic systems such as mobile telephones or tablets comprising screens displaying information and/or images destined for a user, for example a user of the system, are known.

In such systems, the light power emitted by the screen can be at least partly adapted as a function of the level of ambient light, this level of ambient light being measured by an ambient light sensor (ALS). The point of this sensor is then to be able to adjust the light power emitted by the screen as a function of the level of ambient light for a better perception of the screen by the human eye, as well as to save energy stored in a battery supplying the screen.

For measuring the intensity of the surrounding light, the sensor is disposed today under protective glass, under a dedicated opening in the screen or along the edge of the screen. It would be desirable to dispose the sensor under the screen, without a dedicated opening in the screen, by using the weak transmission of the ambient light through the screen. However, it is thus impossible for the sensor to distinguish with precision the light emitted by the screen downward in the direction of the sensor from the surrounding light passing through the screen from the exterior up to the sensor.

SUMMARY

There is a need to address all or some of the drawbacks of the known electronic systems in which the light power emitted by a screen is at least partly determined by the level of ambient light measured by a sensor of the system.

Thus, one embodiment addresses all or some of the drawbacks of the known electronic systems in which the light power emitted by a screen is at least partly determined by the level of ambient light measured by a sensor of the system.

In particular, one embodiment makes it possible to avoid that the level of ambient light measured by the sensor is distorted by the light emitted by the screen.

One embodiment provides an electronic system comprising:
a control circuit configured to provide a binary control signal alternating between a first binary state during first phases and a second binary state during second phases;
a screen controlled by the control signal, the screen being configured to emit light during each first phase, and not to emit any light during each second phase;
a light sensor disposed under the screen or along the edge of the screen, and configured to provide a measurement signal representative of a quantity of light received by the sensor during a measurement phase or a plurality of consecutive measurement phases; and
a synchronization device configured to synchronize each measurement phase with a second phase.

According to an embodiment, the synchronization device is configured to synchronize the start of each measurement phase with the start of a second phase.

According to an embodiment, the electronic system comprises a processing unit and a control circuit, the control circuit being configured to determine the binary control signal based on a setpoint signal provided by the processing unit.

According to an embodiment, the processing unit is further configured to activate and deactivate the control circuit.

According to an embodiment, the processing unit is configured to determine the setpoint signal based on the measurement signal and the setpoint of a user of the system.

According to an embodiment, the synchronization device comprises the processing unit, the processing unit being further configured to provide to the sensor a synchronization signal for synchronizing the start of each measurement phase.

According to an embodiment, the processing unit is further configured to determine said synchronization signal, at least on the basis of the setpoint signal.

According to an embodiment, the synchronization device comprises the sensor, the sensor being further configured to receive a signal representative of the binary control signal, and to synchronize the start of each measurement phase based on the received signal.

According to an embodiment, the synchronization device comprises the sensor, the sensor being further configured to generate a signal representative of the evolution, as a function of time, of the light received by the sensor.

According to an embodiment, the synchronization device further comprises a processing circuit configured to determine, based on the signal representative of the evolution of the light received by the sensor, the start of each second phase.

According to an embodiment, said processing circuit is further configured to determine a synchronization signal for synchronizing the start of a measurement phase, based on the determination of the start of each second phase, the processing circuit being further preferably configured to determine a frequency of the first and second phases and/or a duty cycle between the first and second phases.

According to an embodiment, said processing circuit is part of the processing unit or of the sensor.

According to an embodiment, the duration of each measurement phase is less than the duration of the second phase with which the measurement phase is synchronized.

A further embodiment provides an electronic device such as a mobile telephone, a tablet or a multimedia appliance comprising an electronic system as defined above.

A further embodiment provides a method implemented in an electronic system as described above or in an electronic device as described above, in which each measurement phase is implemented during a second phase.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may have identical structural, dimensional and material properties.

For the sake of clarity, only the operations and elements that are useful for an understanding of the described embodiments herein have been illustrated and described in detail.

Unless indicated otherwise, when reference is made to two elements that are connected together, this means a direct connection without any intermediate elements other than conductors, and when reference is made to two elements that are linked or coupled together, this means that these two elements can be connected or be linked or coupled by way of one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following disclosure, electronic systems are considered in which the screen operates by alternating phases in which the screen emits light and phases in which the screen is turned off, i.e. the screen emits no light. In such systems, the average light power emitted by the screen and perceived by a user is adapted by modifying the duration of the phases of light emission and/or the duration of the phases in which no light is emitted. The screen is thus controlled by a binary signal, a first binary state of which, corresponding for example to a level of high potential, controls a phase of light emission by the screen, and a second binary state of which, corresponding for example to a level of low potential such as the ground, controls a phase in which no light is emitted by the screen. With adequate switching frequencies between the phases in which the screen emits light and the phases in which the screen is turned off, the user of the screen does not perceive the transitions between these phases, due to the persistence of vision of the human eye.

For instance, the binary control signal generally undergoes pulse-width modulation (PWM). The type of screen, for example LCD (Liquid Crystal Display) or OLED (Organic Light Emitting Diode), to which such control modes apply and the manner of implementation of these control modes have not been described in detail. The described embodiments are compatible with these known control modes and the known screens to which these control modes apply.

Figure 1A:
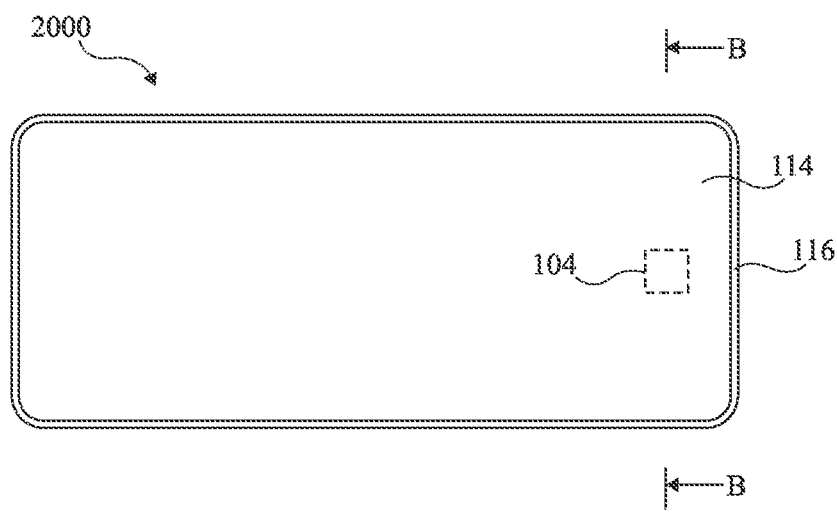
FIGS. 1A-1B illustrate an embodiment of an electronic device.
Figure 1B:
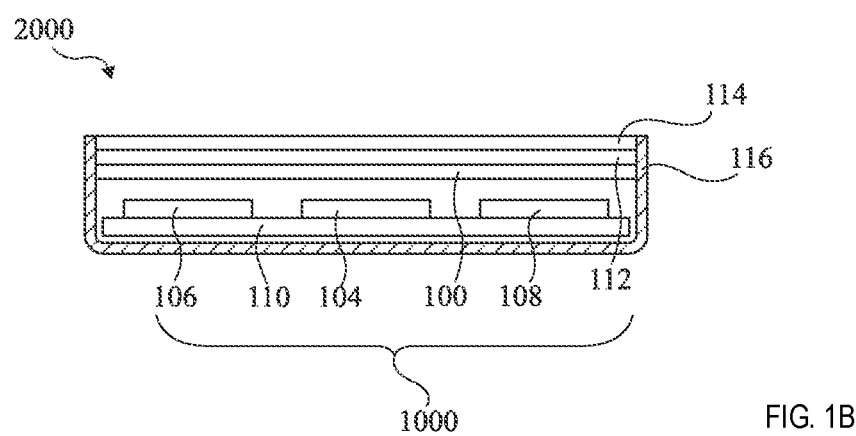

FIGS. 1A and 1B illustrate two views A and B of an embodiment of an electronic device 2000, in this example a mobile telephone 2000, the view A being a front view of the telephone 2000 and the view B being a sectional view along the plane BB indicated in view A.

The device 2000 comprises an electronic system 1000. The electronic circuit 1000 comprises a screen 100 intended to display images and/or information destined for a user. The display screen, or panel, 100 comprises a matrix of pixels (not illustrated) emitting light.

The system 1000 further comprises various electronic circuits including an ambient light sensor 104. In the example shown in FIG. 1B, in the view B, two further electronic circuits, namely a processing unit 106 and a driver, or control, circuit 108, of the screen 100, are illustrated.

The various electronic circuits of the system 1000 are, for example, mounted on a printed circuit board (PCB) 110, preferably a flexible printed circuit board, in order to be electrically coupled with one another via the board 110. Although a sole board 11o is illustrated in the view B shown in FIG. 1B, the system 1000 can comprise a plurality of boards 110 possibly electrically coupled with one another via ribbon cables.

For instance, the display screen 100 can be of the OLED type (Organic Light Emitting Diode). The screen 100 is thus, for example, controlled by a binary control signal, for example generated by the driver circuit 108. This control signal is, for example, provided selectively to each diode of the screen, so as to alternate phases in which at least certain diodes of the screen 100 emit light and phases in which no diode of the screen 100 emits light. The selection of the diodes of the screen 100 receiving or not receiving the control signal is, for example, implemented by the driver circuit 108. In certain cases, the driver circuit 108 can further adapt, for each diode, the voltage level of the binary signal corresponding to a phase of light emission so as to adapt the light power emitted by the diode. Each pixel of the screen can be constituted by one or more diodes, possibly covered by an RGB (Red, Green, and Blue) color filter.

For instance, the display screen 100 can also be of the LCD type (Liquid Crystal Display). The screen 100 thus comprises, for example, a matrix of pixels each comprising polarizing liquid crystal filters, and an illuminating panel disposed under the matrix of pixels. The plate is, for example, controlled by a binary control signal, for example generated by the driver circuit 108, so that the plate operates by alternating phases of light emission and phases in which the plate does not emit any light. In certain cases, the driver circuit can further adapt the voltage level of the binary signal corresponding to a phase of light emission so as to adapt the light power emitted by the diode. The polarizing filters of each pixel are controlled, for example by the driver circuit 108 of the screen 100, to let through or to not let through the light emitted by the plate through the polarizing filters, toward a user. Each pixel of the screen can be covered by one or more RGB color filters.

In the illustrated example, the system 1000 further comprises, above the display screen 100, a touch screen 112. The touch screen, or touch plate, 112 entirely covers the display screen 100, the screens 100 and 112 having substantially the same surface areas, preferably the same surface areas.

Typically, the device 2000 comprises a protective glass pane 114 covering the screen 100, and, more specifically in this example, the assembly constituted by the two screens 100 and 112. The glass pane 114 entirely covers the screen 100, the surface area of the glass pane 114 being substantially equal to that of the screen 100, preferably equal to that of the screen 100.

The device 2000 comprises a housing, or shell, 116, in which the system 1000 is disposed, i.e. in which the electronic circuits 104, 106 and 108 and the one or more boards 100 are disposed. The assembly of the screen 100, the possible touch screen 112 and the glass pane 114 closes the housing 116 on the side of a face of the system, the upper face in the view B of FIG. 1B, and the face that is visible in the view A of FIG. 1A.

In this embodiment, the telephone 2000 is called "borderless", i.e. the screen 100, and more specifically the assembly of the screen 100, the possible touch screen 112 and the glass pane 114 occupies substantially the entire face, preferably the entire face, of the device intended to be viewed by the user of the system, i.e. the upper face of the device 2000 in the view B of FIG. 1B. The ambient light sensor 104 is thus disposed under the screen 100, i.e. on the side of the screen 100 opposite the face of the screen 100 visible to the user. The display screen 100, the touch screen 112 and the glass pane 114 are thus at least partially transparent to the ambient light, the ambient light corresponding here to the visible light and possibly to infra-red and/or ultra-violet light. Thus, ambient light can pass through the assembly of the glass pane 114, the possible touch screen 112 and the display screen 100, and reach the sensor 104.

Figure 2A:
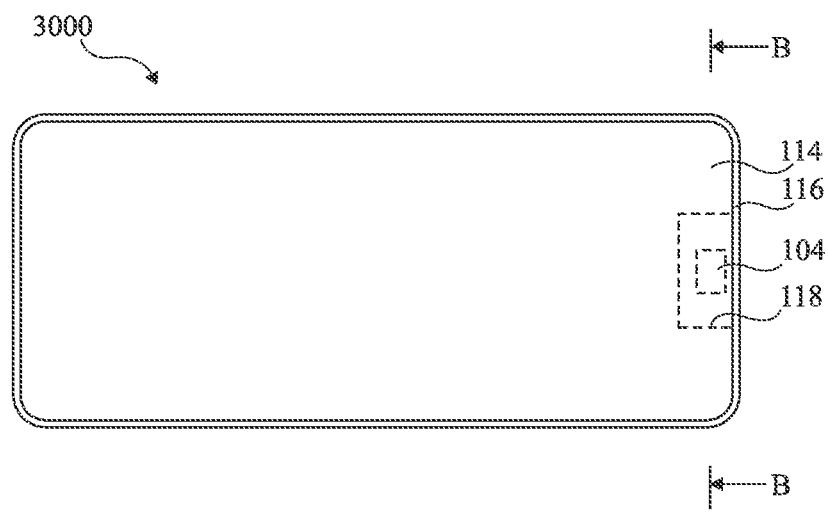
FIGS. 2A-2B illustrate a further embodiment of an electronic device.
Figure 2B:
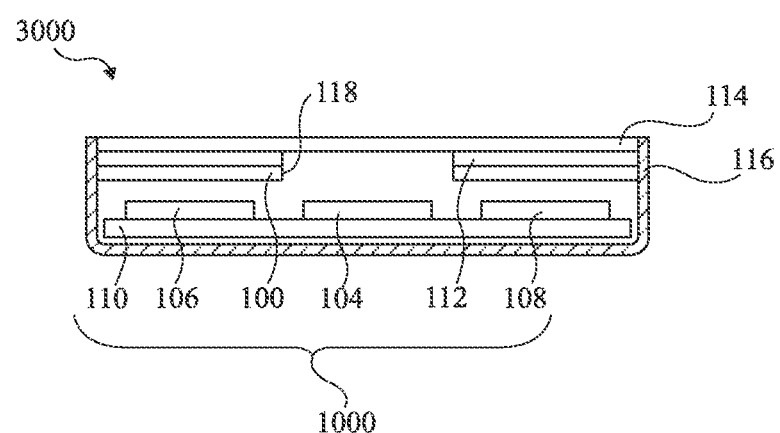

FIGS. 2A and 2B illustrate two views A and B of a further embodiment of an electronic device 3000, in this example a mobile telephone 3000, the view A being a front view of the telephone and the view B being a sectional view along the plane BB indicated in view A.

The device 3000 of FIGS. 2A and 2B differs from the device 2000 of FIGS. 1A and 1B in that the display screen 100 and the possible touch screen 112 are interrupted above the sensor 104 in order to allow the ambient light to reach the sensor 104. More specifically, a window 118 is provided in the screen 100 and the possible screen 112, above the sensor 104. The glass pane 114 covers the window 118 so as to protect the electronic circuits disposed in the housing 116, and in particular the sensor 104.

It should be noted that the devices 2000 and 3000 are illustrated in a schematic fashion, and that not all details of these devices have been illustrated. The embodiments that will be described in the following are not limited to the example devices shown in FIGS. 1 and 2, but apply to all electronic devices comprising an electronic system 1000, for example tablets, connected watches, computer screens, mobile telephones, multimedia apparatus equipped with a, for example flexible or pliable, screen, etc. More specifically, the described embodiments apply to electronic systems 1000 comprising a display screen 100 and an ambient light sensor 104 disposed under the screen 100 as illustrated in FIG. 1B, or under a window, or opening, 118 of the screen 100 as illustrated in FIG. 2B, in which the screen 100 operates by alternating phases of light emission and phases in which no light is emitted.

Figure 3:
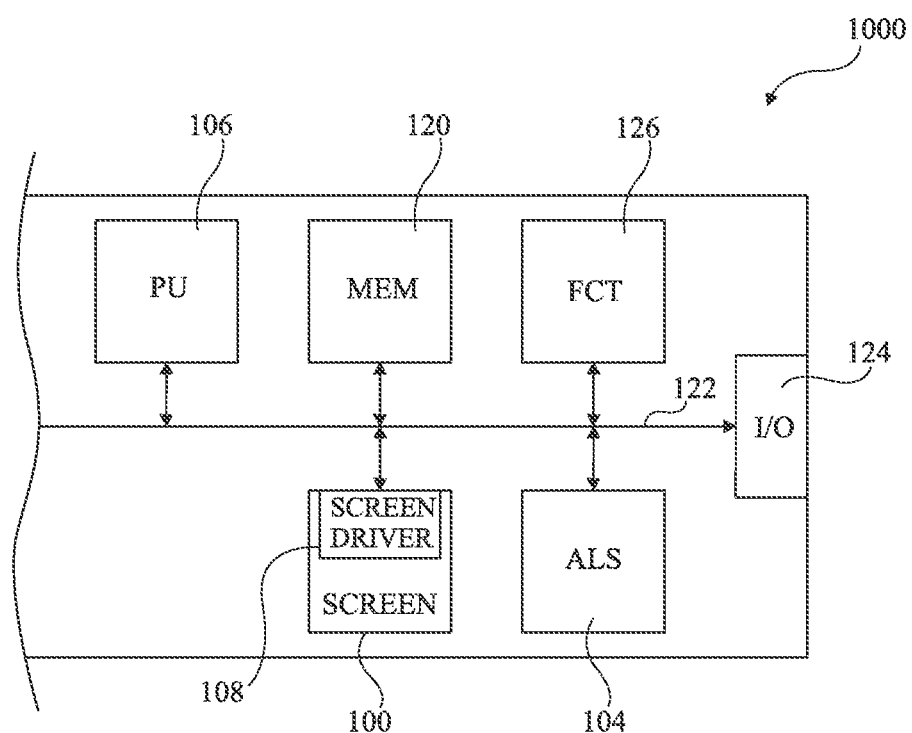
FIG. 3 illustrates, in a schematic fashion and in the form of blocks, an electronic system of the device shown in FIG. 1 or 2.

FIG. 3 illustrates, in a schematic fashion and in the form of blocks, the electronic system 1000 shown in FIG. 1A, 1B, 2A or 2B.

The system 1000 comprises:

the processing unit 106 (PU), for example a state machine, a microprocessor, a microcontroller, a programmable logic circuit, etc.;

one or more storage zones 120 (MEM), each storage zone, or memory, potentially being volatile, for example of the RAM memory type or registers, for temporarily storing information (instructions, addresses, data) during processing, or non-volatile, for example of the flash type, for storing information in a permanent manner and in particular when the system 1000 is not supplied with power;

one or more data, address and/or control buses between the internal electronic circuits of the system 1000, illustrated here in the form of a sole bus 122;

an input-output communication interface 124 (I/O), for example of the serial bus type, for communicating with the outside of the system 1000;

the screen (SCREEN) 100;

the driver circuit 108 (SCREEN DRIVER) of the screen 100, illustrated here as part of the screen 100; and the ambient light sensor (ALS) 104.

Furthermore, the system 1000 can integrate other functions, represented by a block 126 (FCT), for example, a crypto-processor, further interfaces, further memories, a camera, an image sensor, etc.

The one or more electrical supplies of the various elements of the system 1000, in particular the electrical supply of the circuit 108, are not illustrated in FIG. 3.

In the system 1000, the processing unit 106 is configured to provide a setpoint signal to the circuit 108. This setpoint signal is representative of a setpoint value of the average light power that the screen 100 needs to emit. For instance, this setpoint value is determined on the basis of a measurement signal provided by the sensor 104, the measurement signal being representative of the quantity of light, or more precisely the quantity of photons, received by the sensor 104 during a phase of measurement of the ambient light. The dependence of the setpoint value on the measured level of ambient light allows an automatic adjustment of the light power emitted by the screen as a function of the level of ambient light. This setpoint value can also depend on a luminosity setpoint of the screen 100 provided manually to the system 1000 by the user.

As a function of this setpoint signal, the circuit 108 adapts the binary control signal that it provides to the screen 100, and more specifically adapts the duration during which the signal is in the first binary state, and/or the duration during which the signal is in the second binary state. This amounts to adapting the duration of the phases of operation in which the screen 100 emits light and/or the duration of the phases of operation in which the screen does not emit any light, so that the average luminosity emitted by the screen over a large number of phases of operation, for example more than 100, corresponds to the average setpoint luminosity. It should be noted that it is the average luminosity emitted by the screen that is perceived by the user, since the transitions between the phases of light emission by the screen and non-emission of light by the screen are imperceptible for the human eye due to persistence of vision. For instance, when the control signal of the screen undergoes pulse-width modulation, the circuit 108 increases or decreases the duty cycle of the signal, and, optionally, the circuit 108 can also modify the frequency of the signal.

A drawback of the systems 1000 in which the sensor 104 is disposed under the screen 100, or close to the screen 100, for example along an edge of the screen 100 or under a window or opening 118 of the screen 100, is that the light emitted by the screen can reach the sensor 104, and thus distort the measurement of the level of ambient light.

In the more specific case where the sensor 104 is disposed under the screen 100, the glass pane 114 and the possible touch screen 112, the rates of transmission of ambient light to the sensor 104 can be low, for example lower than 5%, or 1%. In this case, the light emitted by the screen 100 that reaches the sensor 104 can have a light power comparable to the ambient light transmitted up to the sensor 204, which poses a problem.

In order to address these drawbacks, the inventor proposes here to exploit the control mode of the screen 100, and more specifically the alternation of the phases of operation in which the screen 100 emits light and those in which the screen 100 does not emit any light. More specifically, the inventor proposes here to provide, in the system 1000, a synchronization device or circuits configured in order that each phase of measurement of the level of ambient light by the sensor 104 is implemented during a phase of operation in which the screen 100 does not emit any light. In other words, the inventor proposes here to provide a synchronization device configured to synchronize each measurement phase of the sensor 104 with a phase of operation in which the screen 100 does not emit any light, and more specifically a synchronization device configured to synchronize the start of each phase of measurement of the level of ambient light with the start of a phase of operation in which the screen does not emit any light. Indeed, a phase of measurement by the sensor 104 generally has a shorter duration than that of the phases in which the screen 100 does not emit any light when the screen is controlled by pulse width modulation. Thus, the measurement effected by the sensor 104 is not distorted by light emitted by the screen that could reach the sensor 104.

Various embodiments will now be described in greater detail in relation to FIGS. 4, 5, 6 and 7.

Figure 4:
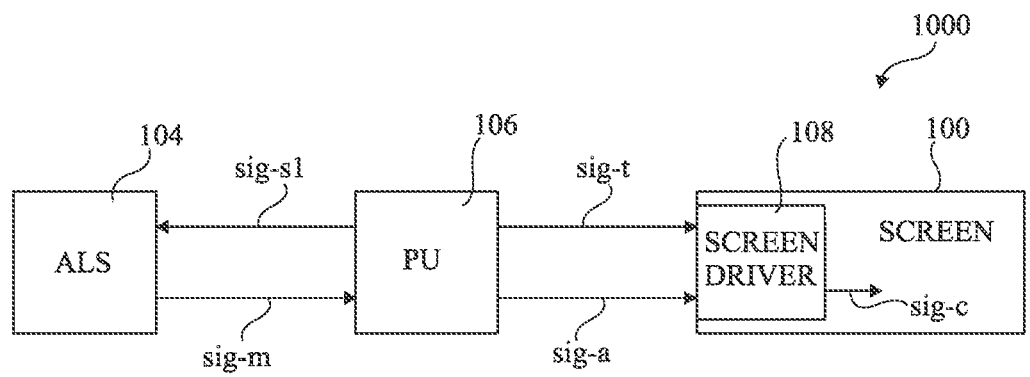
FIG. 4 illustrates, in a schematic fashion and in the form of blocks, an embodiment of a part of the electronic system shown in FIG. 3.

FIG. 4 illustrates, in the form of blocks and in a more detailed manner, an embodiment of a part of the electronic system 1000 shown in FIG. 3. FIG. 4 illustrates more specifically the sensor 104, the central unit 106 and the driver circuit 108 of the screen 100, the circuit 108 being part of the screen 100 in this example.

In this embodiment, the synchronization device comprises the processing unit 106. The synchronization of the measurement phases of the sensor 104 with the phases of operation in which the screen 100 does not emit any light is thus at least partly implemented by the processing unit 106.

As has been described in the foregoing, the processing unit 106 is configured to provide a setpoint signal, designated as sig-t, to the circuit 108.

According to an embodiment, the unit 106 is further configured to provide an activation signal sig-a to the circuit 108. The signal sig-a indicates to the circuit 108 whether or not it needs to provide the binary control signal, designated as sig-c, to the screen 100. In other words, the signal sig-a indicates whether the screen 100 needs to be in operation and controlled by the signal sig-c (circuit 108 active), or whether the screen 100 needs to be turned off (circuit 108 inactive). When the circuit 108 is active, the binary control signal sig-c controls the alternation of the phases of operation in which the screen 100 emits light with those in which the screen 100 does not emit any light.

The sensor 104 is configured to provide, after each measurement of the level of ambient light, a measurement signal sig-m representative of the quantity of light received during each measurement phase. The signal sig-m is, for example, determined by the sensor 104 during a processing phase following the measurement phase, this processing phase potentially being implemented regardless of the state of the binary control signal, i.e. whether or not the screen 100 is in a phase of light emission.

Although not illustrated here, according to an embodiment, the sensor 104 is configured to implement a plurality of successive measurement phases before providing the signal sig-m, this latter thus being representative of the quantity of total light received during the successive measurement phases. For instance, the unit 106 is thus configured to provide to the sensor 104 a signal indicating whether a plurality of measurement phases need to be successively carried out before providing the corresponding signal sig-m, or whether the signal sig-m should be provided after each measurement phase.

In this embodiment, the central unit 106 is configured to provide to the sensor 104 a synchronization signal sig-s1 for synchronizing the start of each measurement phase. More specifically, the signal sig-s1 indicates, for example by a change in binary state when the signal sig-s1 is a binary signal that the sensor 104 needs to start a measurement phase. The unit 106 can thus synchronize, via the signal sig-s1, the start of each measurement phase with a phase of operation in which the control signal sig-c is in the second binary state, i.e. a phase of operation in which the screen 100 does not emit any light.

For instance, the unit 106 determines the signal sig-s1 based on the setpoint signal sig-t that it provides to the circuit 108. Indeed, the unit 106 can deduced from the signal sig-t the characteristics (frequency, duty cycle, etc. . . . ) of the control signal sig-c, for example based on a table of correspondence between each value that the signal sig-t can potentially have and the corresponding characteristics of the signal sig-c.

The embodiment shown in FIG. 4 is more specifically adapted to the case where the signal sig-c undergoes pulse-width modulation. In this case, the unit 106 determines, for example, the time at which the circuit 108 passes from a deactivated state to an activated stated based on the signal sig-a, and can deduce therefrom the start time of each alternation of a phase of operation in which the screen emits light and a phase of operation in which the screen does not emit any light. For each alternation, the start time of the phase in which the screen does not emit any light can correspond to the start time of the alternation, or be deduced from the start time of the alternation or from the knowledge of the duty cycle of the signal sig-c, the duty cycle of the signal sig-c being, for example, determined based on the setpoint signal sig-t.

Figure 5:
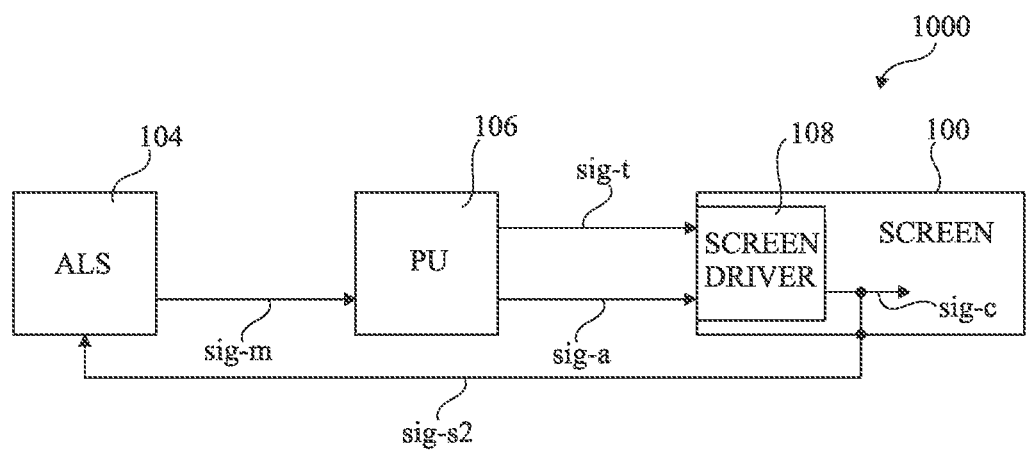
FIG. 5 illustrates, in a schematic fashion and in the form of blocks, a further embodiment of a part of the electronic system shown in FIG. 3.

FIG. 5 illustrates, in the form of blocks and in a more detailed manner, a further embodiment of a part of the electronic system 1000 shown in FIG. 3. More specifically, FIG. 5 illustrates the sensor 104, the central unit 106 and the driver circuit 108 of the screen 100, the circuit 108 being part of the screen 100 in this example. Only the differences between the part of the system 1000 illustrated in FIG. 4 and the part illustrated in FIG. 5 are shown here in detail.

In this embodiment, the synchronization device for synchronizing the measurement phases of the sensor 104 with the phases in which the screen 100 does not emit any light comprises the sensor 104. This synchronization is thus at least partly implemented by the sensor 104, based on a synchronization signal sig-s2 representative of the control signal sig-c provided to the screen 100.

In the embodiment shown in FIG. 5, the unit 106 does not provide a signal sig-s1.

Moreover, in the embodiment shown in FIG. 5, the sensor 104 is configured to receive the synchronization signal sig-s2 representative of the control signal sig-c. In this example, the signal sig-s2 is identical to the signal sig-c. In further examples not illustrated, the signal sig-s2 can correspond to the signal sig-c the potential levels of which corresponding to the first and second binary states have been adapted, for example by the circuit 108 or by a dedicated circuit.

The signal sig-s2 provided to the sensor 104 allows it to know, or determine, the start time of each phase in which the screen 100 does not emit any light. The sensor 104 is thus configured to synchronize each of its measurement phases with a phase of operation in which the screen 100 does not emit any light. In this example where the signals sig-c and sig-s2 are identical, the switching of the signal sig-s2 from the first binary state to the second binary state indicates the start of a phase of operation in which the screen emits no light and the sensor 104 can thus synchronize the start of a measurement phase with the start of this phase of operation.

Compared to the embodiment shown in FIG. 4, the embodiment shown in FIG. 5 makes it possible to limit the time discrepancy between the start of a phase in which the screen 100 does not emit any light and the start of a measurement phase. This results from the fact that, in the embodiment shown in FIG. 5, the synchronization signal sig-s2 received by the sensor 104 is obtained directly from the control signal sig-c, while, in the embodiment shown in FIG. 4, the circuit 108 and/or the processing unit 106 can introduce a time discrepancy between the control signal sig-c and the synchronization signal sig-s1 received by the sensor 104. For instance, this time discrepancy can be due to a plurality of circuits each communicating in turn, for example via the bus of the system, and sharing the same control signals.

Figure 6:
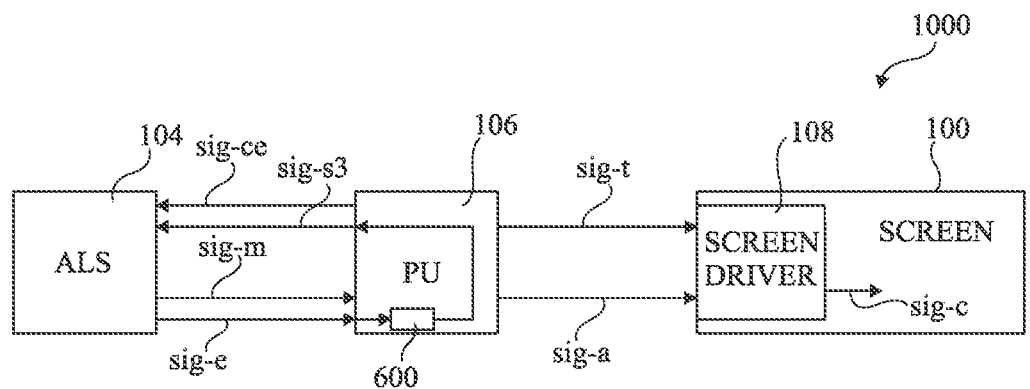
FIG. 6 illustrates, in a schematic fashion and in the form of blocks, a further embodiment of a part of the electronic system shown in FIG. 3.

FIG. 6 illustrates, in the form of blocks and in a more detailed manner, a further embodiment of a part of the electronic system 1000 shown in FIG. 3. More specifically, FIG. 6 illustrates the sensor 104, the central unit 106 and the driver circuit 108 of the screen 100, the circuit 108 being part of the screen 100 in this example. Only the differences between the part of the system 1000 illustrated in FIG. 5 and the part illustrated in FIG. 6 are shown here in detail.

In this embodiment, the extraction of characteristics of the control signal sig-c is provided, from a signal sig-e representative of the temporal evolution of the light power received by the sensor 104. The synchronization between the measurement phases of the sensor 104 and the phases of operation in which the screen does not emit any light is thus implemented based on these extracted characteristics. Thus, in this embodiment, the synchronization device comprises the sensor 104, which is thus configured to provide the signal sig-e, and a processing circuit 600 configured to extract characteristics of the signal sig-c from the signal sig-e.

The fact is thus exploited here that, during a phase of light emission by the screen 100, a part of this emitted light is received by the sensor 104 and is added to the ambient light received by the sensor 104. Thus, characteristics of the control signal sig-c such as the frequency of the signal sig-c, the time ranges in which the signal sig-c is respectively in the first binary state and in the second binary state, the duty cycle of the signal sig-c, etc., can be extracted from the signal sig-e. For instance, the signal sig-e is an analogue signal the amplitude of which varies with the light power received by the sensor.

In this embodiment, the circuit 600 is part of the unit 106, the signal sig-e thus being provided to the processing unit 106. As a variant, the circuit 600 can be a dedicated circuit, external to the unit 106, corresponding, for example, to a block FCT (FIG. 3).

According to an embodiment, as long as the unit 106 sends a control signal sig-ce to the sensor 104, the sensor 104 provides the signal sig-e. In a variant embodiment not illustrated, the unit 106 does not provide any signal sig-ce to the sensor 104, which thus provides the signal sig-e in a continuous manner.

According to an embodiment, in addition to being configured to extract characteristics of the signal sig-c from the signal sig-e, the circuit 600 is configured to determine a synchronization signal sig-s3 provided to the sensor 104. As a variant, the central unit 106 determines the signal sig-s3 based on the characteristics extracted from the signal sig-e by the circuit 600.

The signal sig-s3 indicates to the sensor 104 the start times of the phases of operation of the screen 100 in which the latter does not emit any light. The sensor 104 is thus configured to synchronize the start of each phase of measurement of the level of ambient light with a start time of a phase of operation in which the screen 100 does not emit any light.

An advantage of the embodiment shown in FIG. 6 with respect to the embodiments shown in FIGS. 4 and 5 is that the synchronization is based on the signal sig-e which takes into account possible discrepancies between the level changes of the signal sig-c and the changes in phases of operation (emission or non-emission) of the screen. For instance, this discrepancy can result from a discrepancy between the control of the screen and the display by the screen, for example due to a display delay, the rise time of the electroluminescent diodes of the screen and/or a congestion of the buses or communication paths of the system.

Figure 7:
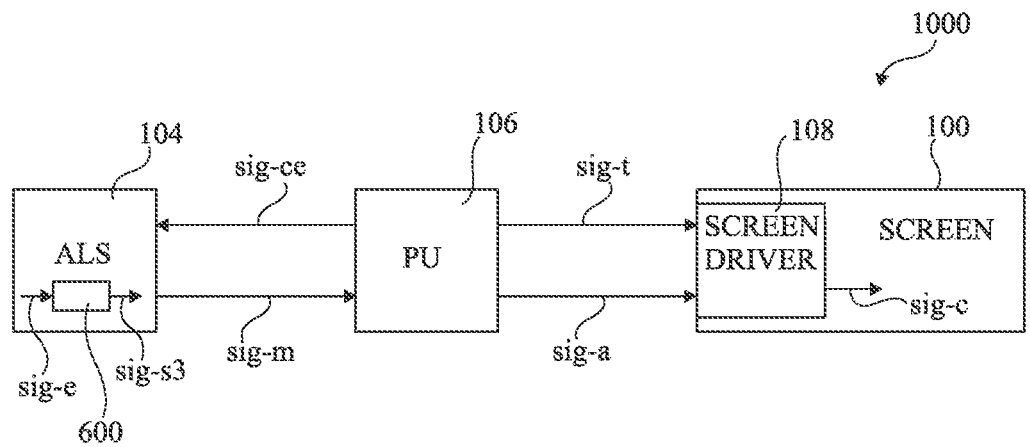
FIG. 7 illustrates, in a schematic fashion and in the form of blocks, a variant embodiment of the part of the electronic system illustrated in FIG. 6.

FIG. 7 illustrates in the form of blocks a variant of the embodiment described in relation to FIG. 6. Only the differences between the systems 1000 shown in FIGS. 6 and 7 have been described in detail.

In FIG. 7, the processing circuit 600 is part of the sensor 104 rather than of the unit 106. Thus, unlike the embodiment shown in FIG. 6 where the signal sig-e is transmitted to the unit 106 which, in return, provides the signal sig-s3 to the sensor 104, in the variant embodiment shown in FIG. 7, these signals sig-e and sig-s3 are internal to the sensor 104. In particular, it is provided here that the sensor 104, and in particular its processing circuit 600, are configured to determine the frequency of the alternation between the phases of light emission by the screen and the phases in which the screen is turned off, the start of each phase of light emission by the screen, the end of each phase of light emission by the screen and/or the duty cycle between the phases of light emission by the screen and the phases in which the screen is turned off. Thus, the sensor 104 is autonomous and is capable, on the basis of the above information, of implementing phases of light capture when the screen is in a phase of operation in which it does not emit any light.

The variant embodiment shown in FIG. 7 benefits from the same advantages as the embodiment shown in FIG. 6. The variant embodiment shown in FIG. 7 is further simpler than the embodiment shown in FIG. 6 as the synchronization of the phases of capturing the surrounding light with the phases of operation in which the screen does not emit any light is implemented inside the sensor 104, which simplifies the integration of the sensor 104 in an electronic system 1000.

Figure 8:
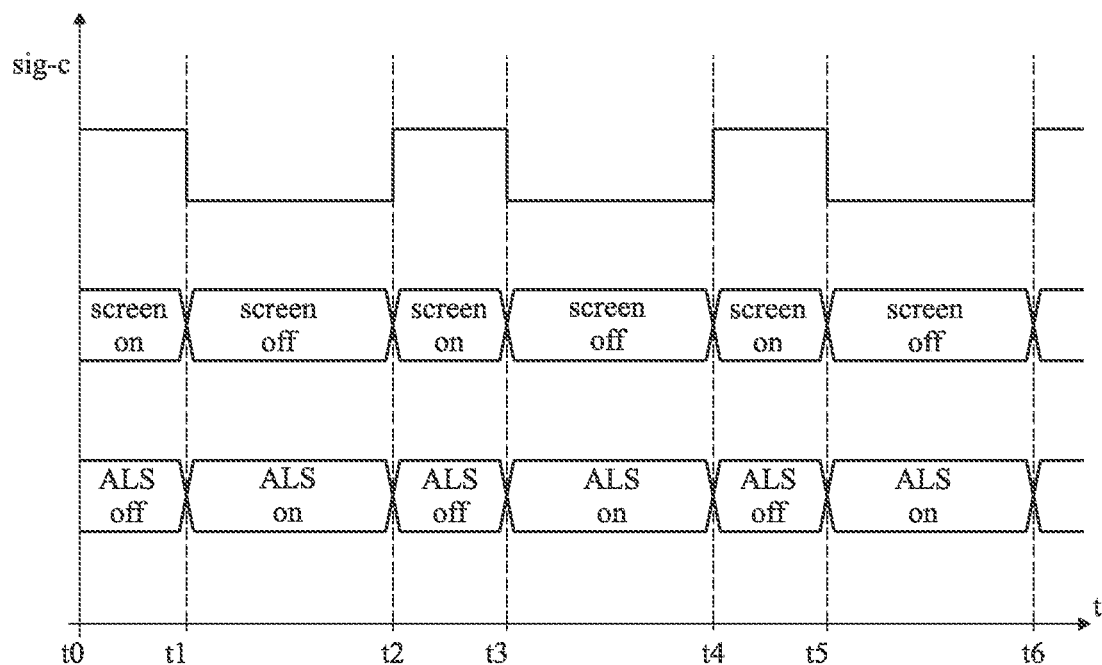
FIG. 8 illustrates time charts depicting a mode of operation of the electronic system shown in FIGS. 3 to 7.

FIG. 8 illustrates time charts depicting a mode of operation of the system 1000 described in the foregoing. In this example, a phase of measurement of the level of ambient light is implemented by the sensor 104 during each phase in which the screen does not emit any light.

FIG. 8 illustrates the control signal sig-c for controlling the phases of light emission by the screen and the phases in which the screen does not emit any light, the circuit 108 being active here. In this example, the low level of the signal sig-c controls the screen so that it does not emit any light ("screen off"), and the high level of the signal sig-c controls the screen so that it emits light ("screen on").

FIG. 8 also illustrates the phases of measurement of the level of ambient light by the sensor 104 ("ALS on") and the phases in which the sensor does not measure the level of ambient light ("ALS off"). A phase of measurement of the level of ambient light by the sensor is considered here to correspond to a phase of integration by the sensor 104, i.e. a phase in which photons are received by a photosensitive zone of the sensor. The processing of the number of photons received during a phase of integration or measurement of the level of ambient light, for example for generating the signal sig-m representative of the number of photons received during this phase of integration, i.e. representative of the level of ambient light, being realized, in this example, after each phase of integration, for example at least partly during the following phase of light emission by the screen.

More specifically, in this example, phases of light emission by the screen start at the respective times t0, t2, t4, and t6 and end at the respective times t1, t3 and t5, the times t0, t1, t2, t3, t4, t5 and t6 being successive times. Thus, as described in the foregoing, in this example, phases of measurement of the level of ambient light by the sensor 105 are respectively implemented between the times t1 and t2, between the times t3 and t4, and between the times t5 and t6. More specifically, at each of the times t1, t3 and t5, a phase of measurement of the level of corresponding ambient light begins.

Although, in FIG. 8, each phase of measurement of the level of ambient light ends at the end of a corresponding phase in which the screen does not emit any light (times t2, t4 and t6), in practice, each phase of measurement of the level of ambient light can end before the end of the corresponding phase in which the screen does not emit any light.

Although this is not illustrated in FIG. 8, when the sensor 104 has ended a measurement phase, the sensor starts a processing phase during which it determines, or updates, the signal sig-m representative of the level of ambient light measured during the measurement phase. This processing phase can begin during the corresponding phase in which the screen does not emit any light, and continue or be entirely implemented during the following phase in which the screen emits light.

Moreover, although not illustrated, according to the implemented embodiment, each phase of measurement of the level of ambient light by the sensor 104 can begin with a delay with respect to the start of the corresponding phase in which the screen does not emit any light. However, each phase of measurement of the level of light by the sensor ends at the latest at the end of the corresponding phase in which the screen does not emit any light.

For instance, the phases in which the screen does not emit any light have a duration in the order of 3.6 ms, or less, the phases in which the screen emits light having a duration in the order of 0.4 ms, or less. For instance, a phase of measurement or integration of the level of ambient light by the sensor 104 has a duration in the order of 0.1 ms to 1 ms, preferably while taking into account possible processing delays of the various optical and electronic circuits involved.

In the embodiments and variants described above, the sensor 104 can be configured to provide a signal sig-m representative of the light received during one or more measurement phases for a single wavelength range, for example the range of the wavelengths in the visible range possibly extended to the infra-red and/or ultra-violet wavelengths. In this case, the system 1000 cannot determine the type of ambient light that it receives. As a variant, the sensor 104 can be configured to provide a signal sig-m comprising, for each of a plurality of wavelength ranges, information representative of the quantity of light received, in this wavelength range, by the sensor during one or more measurement phases. In this case, the system 1000 can be configured to determine the type of ambient light, for example if the light is natural, from a filament light bulb, from a fluorescent light bulb, if the light is a cold or warm light, etc. In the case where the screen 100 is a color screen of the OLED type, the unit 106 can thus be configured to provide a signal sig-t comprising, for each wavelength range that the screen 100 can emit, an indication of the average target power that the screen 100 needs to emit for this wavelength range. Indeed, in the case of an OLED color screen, the circuit 108 is generally configured to control each pixel of the screen individually. As a result, the system 1000 can thus adapt the type of light emitted by its screen 100 to the type of ambient light.

Furthermore, although it has not been described, due to the delays in transmitting and processing the signals sig-t, sig-a, sig-e and sig-s1, sig-s2 or sig-s3, the start time of a phase of operation in which the screen 100 does not emit any light that is indicated by the signal sig-s1, sig-s2 or sig-s3 can be later than the time at which this phase actually begins. The system 1000 can thus comprise a delay circuit configured to take into account these transmissions and processing delays. For example, the delay circuit is configured to delay the synchronization signal sig-s1, sig-s2 or sig-s3 so that the start time of a phase of operation in which the screen does not emit any light indicated by this signal corresponds to the actual start time of the following phase of operation in which the screen does not emit any light. The determination of the delay introduced by the delay circuit can, for example, be implemented during a phase of calibration of the system 1000, and in particular of the delay circuit.

Various embodiments and variants have been described. Those skilled in the art will understand that certain features of these embodiments can be combined and other variants will readily occur to those skilled in the art. In particular, it can be provided that the synchronization between the measurement phases of the sensor 104 and the phases of operation of the screen in which it does not emit any light is carried out by combining the embodiment of FIG. 4 or 5 with the embodiment of FIG. 6 or 7.

Finally, the practical implementation of the embodiments and variants described herein is within the capabilities of those skilled in the art based on the functional description provided hereinabove.

What is claimed is:

1. A system comprising:
   a control circuit configured to provide a binary control signal alternating between a first binary state during first phases and a second binary state during second phases;
   a screen controlled by the binary control signal, the screen being configured to emit light during each first phase, and not emit light during each second phase;
   a light sensor disposed under the screen or along an edge of the screen, the light sensor configured to provide a measurement signal after a plurality of consecutive measurements across a plurality of consecutive second phases, each measurement being a representative of a quantity of light received by the light sensor during each measurement phase; and
   a processing unit configured to determine a setpoint signal based on the measurement signal, the setpoint signal received by the control circuit to set a duration of the first binary state and the second binary state.

2. The system according to claim 1, further comprising a synchronization device configured to synchronize a start of each measurement phase with the start of a respective second phase.

3. The system according to claim 1, wherein the processing unit is further configured to activate and deactivate the control circuit.

4. The system according to claim 1, wherein the processing unit is configured to determine the setpoint signal based on the measurement signal and a setpoint from a user of the system.

5. The system according to claim 1, wherein the processing unit is further configured to provide to the light sensor a synchronization signal for synchronizing a start of each measurement phase.

6. The system according to claim 5, wherein the processing unit is further configured to determine the synchronization signal based on the setpoint signal.

7. The system according to claim 1, wherein the light sensor is further configured to receive a signal representative of the binary control signal and synchronize a start of each measurement phase based on the received signal.

8. The system according to claim 1, wherein the light sensor is further configured to generate a signal representative of an evolution of the light received by the light sensor as a function of time.

9. The system according to claim 8, wherein the system further comprises a processing circuit configured to determine a start of each second phase based on the signal representative of the evolution of the light received by the light sensor.

10. The system according to claim 9, wherein the processing circuit is further configured to:
    determine a synchronization signal for synchronizing the start of each measurement phase based on the determination of the start of each second phase; and
    determine a frequency of each first phase and a frequency of each second phase, or
    determine a duty cycle between each first phase and each second phase.

11. The system according to claim 9, wherein the processing circuit is part of the processing unit or the light sensor.

12. The system according to claim 1, wherein a duration of each measurement phase is less than a duration of a respective second phase with which the measurement phase is synchronized.

13. An electronic device such as a mobile telephone, a tablet or a multimedia apparatus comprising the system according to claim 1.

14. A method, comprising:
    providing, using a control circuit, a binary control signal alternating between a first binary state during first phases and a second binary state during second phases;
    emitting light, using a screen controlled by the binary control signal, during each first phase, and not emitting, using the screen, light during each second phase;
    providing, using a light sensor disposed under the screen or along an edge of the screen, a measurement signal after a plurality of consecutive measurements across a plurality of consecutive second phases, each measurement being a representative of a quantity of light received by the light sensor during each measurement phase; and
    determining, by a processing unit, a setpoint signal based on the measurement signal, a duration of the first binary state and the second binary state is set by the control circuit based on the setpoint signal.

15. The method of claim 14, wherein each measurement phase is implemented during a second phase.

16. The method of claim 14, further comprising activating or deactivating, using the processing unit, the control circuit.

17. The method of claim 14, wherein the setpoint signal is determined based on the measurement signal and a setpoint from a user.

18. The method of claim 14, further comprising synchronizing, using a synchronization circuit external to the light sensor, each measurement phase with a corresponding second phase based on a synchronization signal communicated between the synchronization circuit and the light sensor, the synchronization signal being based on the binary control signal.

19. An electronic system comprising:
    a control circuit configured to provide a binary control signal alternating between a first binary state during first phases and a second binary state during second phases;
    a touch screen controlled by the binary control signal, the touch screen being configured to emit light during each first phase and not emit light during each second phase, the touch screen being of an organic light emitting diode (OLED) type;
    a light sensor disposed under or along an edge of the touch screen, and configured to provide a measurement signal after a plurality of consecutive measurements across a plurality of consecutive second phases, each measurement being a representative of a quantity of light received by the light sensor during each measurement phase; and
    a processing unit configured to determine a setpoint signal based on the measurement signal, the setpoint signal received by the control circuit to set a duration of the first binary state and the second binary state.

20. The electronic system of claim 19, further comprising a synchronization circuit external to the light sensor, the synchronization circuit configured to synchronize each measurement phase with a second phase based on a synchronization signal communicated between the synchronization circuit and the light sensor, the synchronization signal being based on the binary control signal.

* * * * *